June 30, 1931.  G. E. F. HICKOX ET AL  1,812,698
AEROPLANE LANDING GEAR
Filed Dec. 17, 1929    2 Sheets-Sheet 2
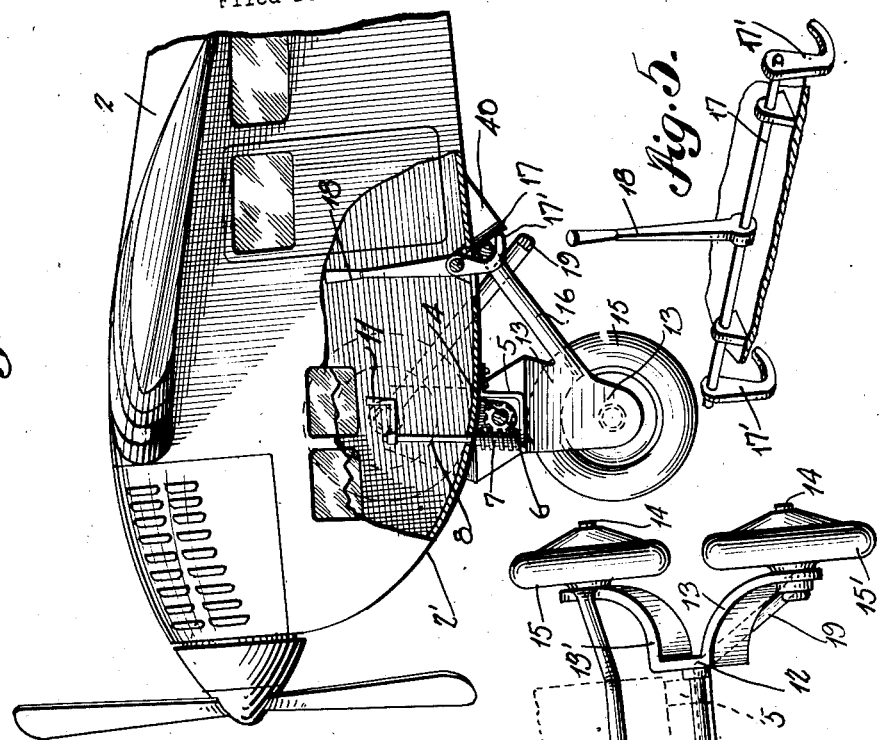
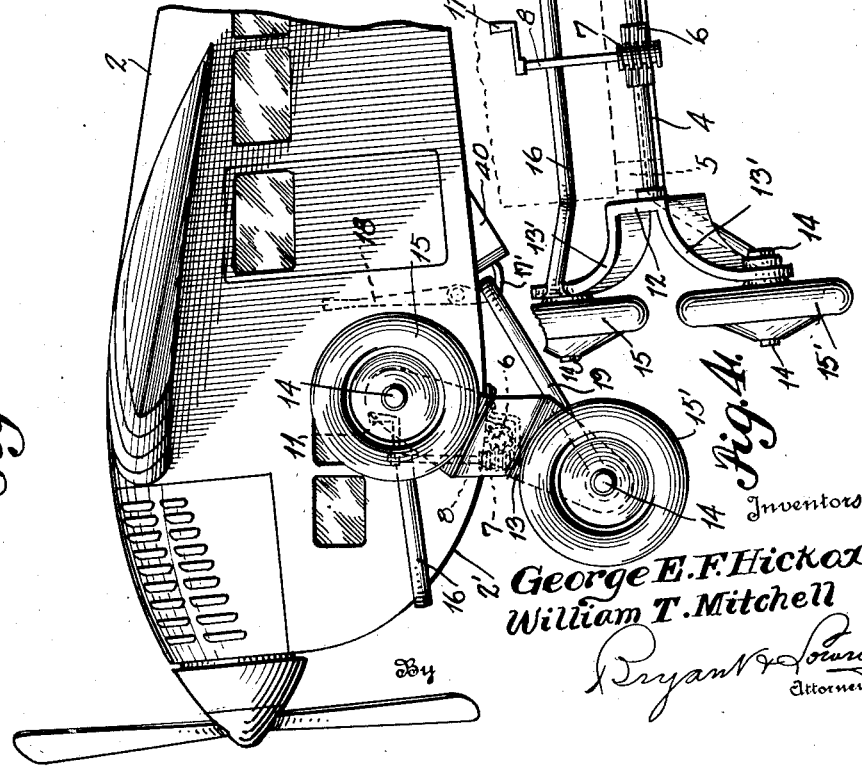
Inventors
George E. F. Hickox
William T. Mitchell
By Bryant & Lowry
Attorneys Patented June 30, 1931

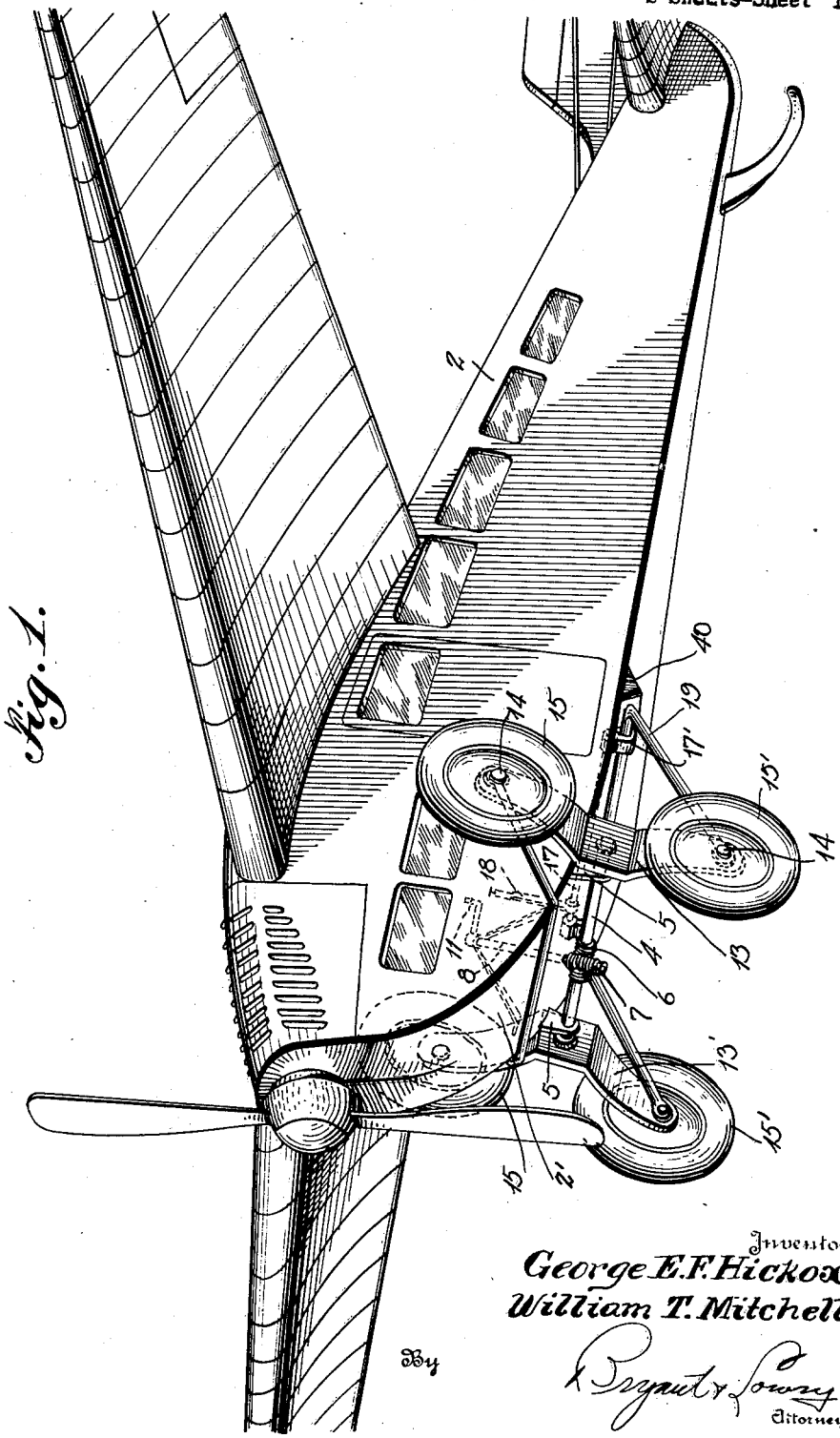

1,812,698

UNITED STATES PATENT OFFICE

GEORGE E. F. HICKOX, OF PROVIDENCE, AND WILLIAM T. MITCHELL, OF CENTRAL FALLS, RHODE ISLAND

AEROPLANE LANDING GEAR

Application filed December 17, 1929. Serial No. 414,768.

This invention has relation to aeroplanes, and particularly to landing gear or equipment and has for its object the provision of means whereby the safe and easy landing of aeroplanes may be accomplished in the event of such accident as the loss of, or injury to one of the landing wheels, in taking off; as well as permitting a new flight in case the gear is damaged in landing.

Aeroplanes are usually provided with a single pair of landing and starting wheels, upon which the safe and easy landing and take off of the plane depends. Such wheels are mounted on a single axle and are intended to simultaneously touch the ground to properly land the plane but no provision has heretofore been made to ensure proper or safe landing in the event, not infrequent, of the loss of one or both wheels or such injury thereto as would incapacitate them from being used, or to permit of an immediate new take-off in case the gear is injured by landing.

In carrying our invention into effect, we provide the aeroplane with two pairs of landing wheels, so mounted on separate spindles that either pair may be so adjusted as to touch and rest on the ground, and we further provide means whereby the proper adjustment and locking in position of the wheels may be effected on the plane while the same is in the air.

Our invention consists in the equipment of an aeroplane with a duplicate or plurality of pairs of landing wheels and with adjusting mechanism whereby either or any set may be brought into requisition, and secured against displacement by the pilot of the plane.

Our invention further consists in the novel construction and combination of the mechanical features hereinafter specifically described and claimed.

In the accompanying drawings illustrating a preferred embodiment of the invention.

Figure 1 is a perspective view of an aeroplane, equipped with the safety landing gear;

Figure 2 is a side view of the forepart of the plane;

Figure 3 is a view similar to Figure 2 with a portion of the fuselage broken away to disclose interior mechanism;

Figure 4 is an end view of the landing gear; and

Figure 5 is a perspective view of a detail portion of the mechanism to support the landing gear.

The numeral 2 designates the fuselage or body of an aeroplane of conventional type upon the side bars 2' or chassis frame of which is secured a transverse shaft or axle 4, journaled in the suspension brackets or bearing blocks 5. This shaft has keyed to it, midway of its ends, a worm wheel 6, which is operatively engaged with a worm 7 carried by a vertical shaft 8, journaled to the framing of the aeroplane. This shaft is provided with a crank lever 11, located within the fuselage and operable by the driver or pilot.

By turning this crank lever, the shaft 8 is rotatable on its axis. To the ends of the shaft 8 are attached the landing wheel carriers, which consist of the plates 12, having outwardly curved diverging arms 13, 13'. These arms carry outwardly projecting, horizontal spindles 14 upon which are journaled the landing wheels 15, 15' of which there are two pairs or sets. Those on each side being in alignment with one another.

As will be seen, the arrangement of the wheels and their carrier is such that, by rotating the shaft 8, either pair or set of wheels may be adjusted to the position shown in the drawings, so that one set will be in the proper position for landing, while the other set will be raised to a position above the base of the fuselage, and outside the same.

The numeral 16 designates a bent, U-shaped bar, rigidly attached at its ends to the arms 13' supporting one set 15' of landing wheels and 17 is a transverse bar or shaft carried by the side bars of the frame, and provided with hooks 17' at its ends which engage with and support the bar 16, when, in one adjustment of the wheels 15, as clearly illustrated in Fig. 3, the bar 16 is raised so that the wheels 15 carried by the arms 13 will be in landing position below the fuselage. A lever 18 attached to the shaft 17 provides for the turning of the shaft to engage the hooks 17' with the bar 16 and to disengage these parts.

It may be observed, however that when the adjustment shown in Fig. 2 is made the parts will be held in position by reason of the engagement of the worm 7 and worm wheel 6, and without holding the bar 16 by means of the hooks 17.

A bent bar 19 of a shape similar to the bar 16 is pivotally attached at its ends to the spindles of the wheels 15' and is so constructed and arranged that when the wheels are shifted from the positions shown in Fig. 2 thus bringing the wheels 15' into landing adjustment, this bar 19 may be swung into such position that it may be engaged by the hooks 17' and held in locked relation thereto.

In starting the aeroplane either set of wheels may be on the ground and support the plane in running position.

Should the wheels 15 be used for this purpose they will be held in position by the interlocking of the bar 16 with the hooks 17' and will be additionally retained by the interengagement of the worm and worm wheel. Should it become necessary, during the flight of the plane to reverse the position of the wheels, the hooks and engaged bar will be disconnected, and the reversal secured by turning the crank lever 11. This action will throw the bar 16 downward and forward so as to bring it in contact with the upwardly curved ends of the chassis bars 2', and prevent further movement. If, the bar 19 is readily accessible it can be raised to a position of engagement with the hooks 17 and full rigidity of the parts secured.

Should the plane be started with the wheels 15' on the ground, as illustrated in Fig. 2, the bar 19 will be raised and engaged with the hooks, while the bar 16 will be raised to the position shown, that is abutting against the frame of the plane. Should it then become necessary, during flight to reverse the positions of the wheels, the bar 19 will be disengaged from the hooks and the shaft 8 rotated through the worm, worm wheel and crank lever until the bar 16 engages with the hooks 17' when further movement is prevented and the wheels 15 brought into landing position.

When either the bar 16, or the bar 19 is raised and engageable by the hooks, it abuts against the beveled cushioning blocks 40, 40' which are secured to the side bars of the chassis or frame and is secured against shock or strain.

It may be noted that, independently of the functions of the bars 16 and 19, the wheels will be held in position where adjusted so that either set may be used for landing or starting purposes, by reason of the engagement of the worm and worm wheel, since the worm wheel and the shaft 4 cannot be turned through any shifting of the wheels. The bars 16 and 19 are however important as bracing means to prevent strain on the shaft 4.

The utility of our invention is seen particularly in two contingencies:

First: When a wheel or wheels are so damaged in leaving the ground as to be useless for the next landing; and Second: When the plane is forced to land on rough ground and one or both wheels are so damaged in landing as to prevent a new take-off of the plane. When this latter accident occurs in planes equipped as at present, with but one pair of wheels, if the locality is remote from a settlement, the pilot or passengers may be exposed to danger or even death as their plane is useless; and protracted delay in such case is inevitable.

By the use of our invention, a new pair of wheels can be brought into use while in the air, or upon the ground after landing, so that disaster to one pair of wheels either in leaving the ground or landing, becomes comparatively unimportant.

We claim:—

1. The combination with an aeroplane of a starting and landing equipment comprising a rotary shaft, means on the plane for operating said shaft, wheel supporting devices fixedly attached to said shaft, two sets of landing and starting traction wheels mounted on said devices with the wheels on either side spaced apart, and arranged and adapted to permit of the alternate movement of the pairs into landing position.

2. The combination with an aeroplane of two separate pairs of landing and starting traction wheels, a transverse shaft rotatably mounted on the plane, and having divergent arms secured to its ends, upon which the wheels are rotatably mounted, means for rotating said shaft to adjust each pair of wheels to a landing position and means for securing the wheels in position when so adjusted.

3. The combination with an aeroplane of duplicate pairs of starting and landing wheels, a rotatable structure carried by the plane on which said wheels are separately mounted, means for adjusting either set of wheels to a landing position by the rotation of said structure and means for locking said structure in either adjusted position.

In testimony whereof we affix our signatures.

GEORGE E. F. HICKOX.
WILLIAM T. MITCHELL.